United States Patent [19]

Barbier et al.

[11] Patent Number: 5,465,177
[45] Date of Patent: Nov. 7, 1995

[54] METHOD AND DEVICE FOR THE PROJECTION OF A COLOR IMAGE RESULTING FROM A MODULATION BY OPTICAL VALVES

[75] Inventors: Bruno Barbier; Patrick Lach, both of Bordeaux, France

[73] Assignee: Sextant Avionique, Meudon la Foret, France

[21] Appl. No.: 127,574

[22] Filed: Sep. 28, 1993

[30] Foreign Application Priority Data

Sep. 28, 1992 [FR] France ................... 92 11539

[51] Int. Cl.⁶ .................. G02B 27/14; G02B 5/22
[52] U.S. Cl. ................ 359/634; 359/618; 359/629; 359/636
[58] Field of Search ................... 359/618, 629, 359/633, 634, 636, 638, 494, 495, 496, 497, 498, 502, 501

[56] References Cited

U.S. PATENT DOCUMENTS

| | | | |
|---|---|---|---|
| 4,256,368 | 3/1981 | Task | 350/408 |
| 4,500,172 | 2/1985 | Gagnon | 350/331 |
| 5,073,830 | 12/1971 | Loucks | 359/495 |
| 5,262,898 | 11/1993 | Laduke | 359/634 |
| 5,298,986 | 3/1994 | Owada | 348/762 |

FOREIGN PATENT DOCUMENTS

| | | |
|---|---|---|
| 0434041 | 6/1991 | European Pat. Off. . |
| 0470588 | 2/1992 | European Pat. Off. . |
| 0475796 | 3/1992 | European Pat. Off. . |
| 9201969 | 2/1992 | WIPO . |

*Primary Examiner*—Georgia Y. Epps
*Assistant Examiner*—Rich Mock
*Attorney, Agent, or Firm*—Kerkam, Stowell, Kondracki & Clarke

[57] ABSTRACT

The modulation by optical valves of three beam coming from a main or auxiliary primary beam of depolarized and collimated white light is achieved by means of two secondary beams of white light that are linearly polarized and perpendicular to each other. The undesirable color components are suppressed to constitute the three constituent color beams of the color image. Through the invention, the geometrical and spectral quality of the image is independent of the main or auxiliary primary beam and the image is as powerful as the one obtained by the standard method of projection. The auxiliary image can be used as a back-up or can be adapted to night-time projection.

19 Claims, 2 Drawing Sheets

5,465,177

METHOD AND DEVICE FOR THE PROJECTION OF A COLOR IMAGE RESULTING FROM A MODULATION BY OPTICAL VALVES

BACKGROUND OF THE INVENTION

1. Field of the Invention

The invention relates to a method and device for the projection of a color image resulting from a modulation by optical valves. It can be applied notably to the projection of an image on a wide screen or to the projection of an image for assistance in the driving or piloting of vehicles such as automobiles or aircraft.

2. Description of the Prior Art

The standard method of projecting a color image consists in using three optical valves to modulate three corresponding color beams that respectively represent the three basic components of color which, in a common example, are red, green and blue. The three color beams are obtained by the direct or successive separation or splitting of a primary beam of white light that is depolarized and collimated. According to the successive separation, the primary beam is first of all separated into two depolarized secondary beams, one representing one of the three color components and the other representing the other two components which are then separated into two beams. Thus, three depolarized color beams are obtained.

The optical valves respectively receive the three electrical signals that respectively represent the same three basic color components of an electrical color video signal. They modulate the three respective color beams by rotation of the polarization of the incident light flux. The modulation therefore necessitates the preliminary polarizing of the three color beams, then an analysis of the polarization. Each of the three valves is therefore placed between an absorption linear polarizer and a linear analyzer of polarization. In practice, it has been found that absorption polarizers cause the loss of about half of the light energy of the three depolarized color beams. Taking the other losses in the projection device to be negligible, the color image resulting from the combination of the three modulated color beams has an energy value that is twice as small as the energy of the primary beam of white light.

It follows from this that a standard projector implementing this method of projection of a color image comprises a generator of a beam of white light that is depolarized and collimated, a separator of the primary beam into secondary beams, three optical valves for the respective modulation of three color beams respectively representing three basic color components and coming from the secondary beams, and means to combine the three color beams to constitute a composite color beam representing the color image.

The generator of the primary beam is commonly formed by a single or composite source of depolarized white light and a collimation device. The valves are liquid crystal matrix plates, each gripped between a first absorption linear polarizer and a polarization analyzer, ordinarily formed by a second absorption linear polarizer.

For the rest of the description, it must be noted that there are two sorts of means of suppression, namely the means for the suppression, from an incident radiation, of a spectral band, either by absorption (filtration) or by deflection direction in a direction (multidielectrical mirror) and means for the suppression, from an incident radiation, of a direction of polarization, either by absorption (polarizer) or by deflection in a direction of propagation (multidielectrical mirror). These means of suppression are arranged so that the luminous intensity of each of the three color beams constituting the projected image comes only from one of the three corresponding optical valves.

Standard projectors currently raise two major problems. The first problem pertains to their reliability which is directly linked to the reliability of the light source. Their reliability is increased by the incorporation therein of an auxiliary or back-up lamp, activated in the event of a malfunction of the main lamp. Naturally, the generation of the back-up primary beam should meet the same constraints as those pertaining to the main primary beam. Both the primary beam generators should therefore be installed fixedly in a projector. Up till now, the installation of back-up projectors integrates poorly with the standard projection devices and gives a color image of lower quality than the one obtained from the main lamp.

For example, a known way of making a projector consists in separating the main primary beam by means of two multidielectrical mirrors. The solution found for the back-up illumination consists in placing the back-up lamp behind the second mirror. This solution has the major drawback of illuminating two valves by two color beams that are different from those coming from the main lamp and of not illuminating the other valve. It is therefore not possible to reproduce all the hues satisfactorily with the back-up installation.

The second problem relates to the adapting of the luminous intensity of the projected image to the ambient light conditions, notably to day-time and night-time conditions. To make the image highly luminous by day and to give it low luminosity by night, the luminous power of the projected image should be capable of varying greatly and, at the same time, it should be possible to keep the same geometrical and spectral quality of the image. The document EP-A-0 246 128 presents the difficulties of making substantial modifications in the luminous intensity of the source of the primary beam of white light and proposes, as a solution, a device for the modulation of the primary beam after collimation. This complex device is therefore added to the structure of the projector and adds to its cost.

Furthermore, the compatibility of the projection devices with night vision equipment imposes a particular emission spectrum on these devices for night-time use. It is indeed necessary to attenuate the red and infrared part of the spectrum emitted at night. This constraint would therefore make it necessary to further add a particular device to modify the spectrum of the primary beams emitted, this device being activated only for night-time projection.

The invention resolves these two problems raised by the standard projection method and the projection devices that result therefrom. Through the invention, the back-up primary beam can give an image having a quality equal to that obtained with the main primary beam. Furthermore, the invention can offer both types of projection, namely projection adapted to day-time conditions and projection adapted to night-time conditions. All these advantages are obtained not by a complication of the method and of the standard projection devices but through a novel method of projection that is as simple as the present method and through the projection device implementing this method.

SUMMARY OF THE INVENTION

According to the invention, there is provided a method for the projection of a color image resulting from the modulation, by optical valves, of three color beams coming from a primary beam of depolarized and collimated white light, wherein the three beams come from the main beam by means of two secondary beams of white light, the directions of propagation of which are separated angularly and the polarizations of which are linear and perpendicular to each other.

As a corollary, there is provided a device for the projection of a color image according to the invention, said device comprising a generator of a beam of depolarized and collimated white light, a separator of the primary beam into secondary beams, three optical valves for the respective modulation of three color beams that respectively represent three basic color components and that come from secondary beams, and means for the combination of the three color beams, wherein the separator produces two secondary beams of white light, the directions of propagation of which are separated angularly and the polarizations of which are linear and perpendicular to each other.

The directions of the two secondary beams are preferably perpendicular to each other while the polarizations may be elliptical and have opposite directions.

BRIEF DESCRIPTION OF THE DRAWINGS

The features and advantages of the invention shall appear from the following description which is given by way of an example and is illustrated by the appended drawings, of which.

MORE DETAILED DESCRIPTION

Figure 1:
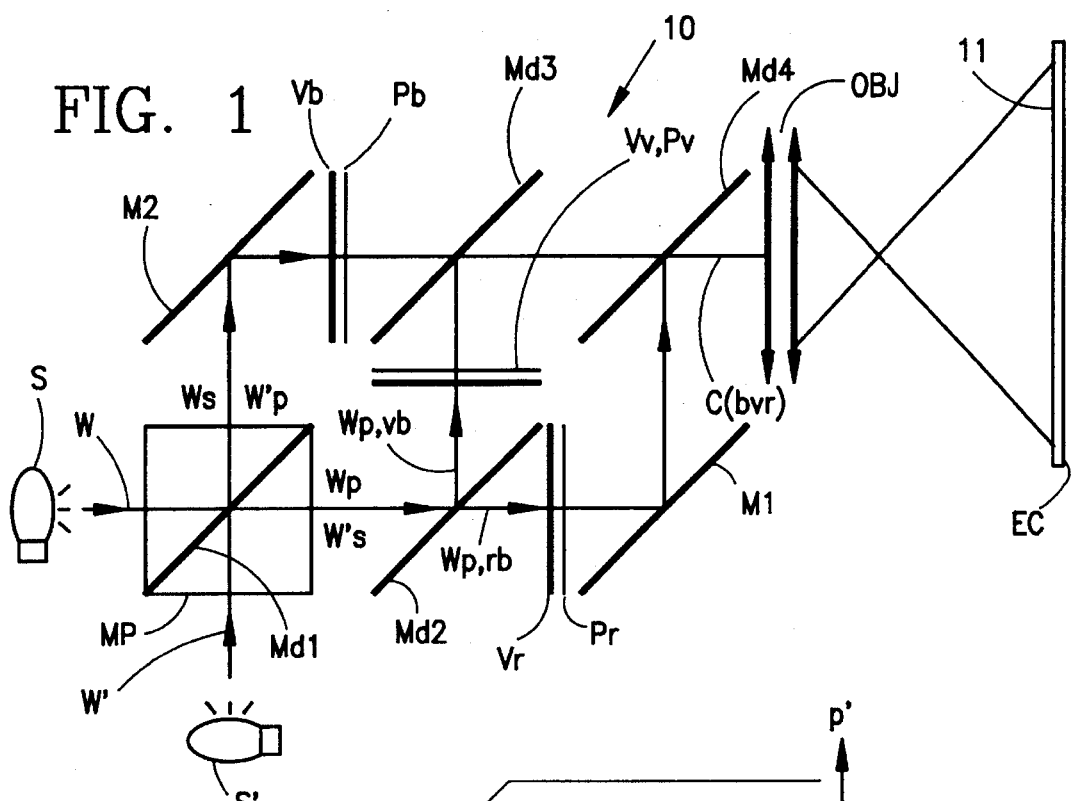
FIG. 1 provides a schematic illustration of an embodiment of a projection device according to the invention.

FIG. 1 shows a first embodiment, according to the invention, of a device 10 for projecting a color image 11. The projection device 10 comprises: a generator S of a main primary beam of depolarized and collimated white light W and a generator S' of an auxiliary primary beam of depolarized and collimated white light W', the generators S and S' being represented symbolically by lamps and being constituted ordinarily in practice by a source of white light and by a collimation device (not shown); a polarizing separator MP presenting two faces which respectively receive the two primary beams W and W' and respectively produce two secondary beams of polarized white light Ws, Wp from the main primary beam W, and W's, W'p from the auxiliary primary beam W', the polarizing separator MP being constituted, in the example illustrated, by a first polarizing multidielectric mirror Md1 mounted in a cube; three optical valves Vb, Vv, Vr respectively receiving the electrical signals representing three basic components of color (blue b, green v and red r in the example illustrated) of a color video signal (not shown), these valves being followed by respective linear analyzers of polarization Pb, Pv, Pr, formed, for example, by absorbent linear polarizers; two mirrors M1 and M2 acting as deflection means; suppression means constituted, in the example illustrated, by three multidielectrical mirrors Md2, Md3 and Md4 designed to form three color beams blue b, green v and red r; means for the combination of the three color beams b, v and r, these means being constituted, in the example illustrated, by the suppression means Md2, Md3, Md4 and producing a composite color beam C representing the color image 11; and an objective OBJ for the projection of the image on any screen-forming means EC.

The two primary beams W and W' strike the polarizing separator cube MP on two adjacent faces, separated by the multidielectrical mirror Md1. The secondary beams that emerge from the cube MP are perpendicular to each other and are aligned with the two primary beams W and W'. As can be seen more clearly from the example illustrated in FIG. 2, the secondary beams Ws and Wp coming from the primary beam W respectively have a direction of polarization (p) parallel to the plane of incidence and a direction of polarization (s) perpendicular to the plane of incidence. For this reason, the secondary beams are designated by the letter W or W' of the primary beam that has produced them, followed by the letter p or s of their direction of polarization.

In FIG. 1, the secondary beam Wp is propagated in the direction of the main primary beam W, while the direction of perpendicular propagation of the secondary beam Ws is deflected by the mirror M2 to be parallel to the secondary beam Wp. The deflected beam Ws is modulated by the blue color component applied to the valve Vb, then it is analyzed by the absorbent polarizer Pb. The other secondary beam Wp is divided by the separator Md2 into two tertiary beams Wpvb and Wprb that are perpendicular to each other. In the example illustrated, the separator Md2 is a multidielectric mirror that does not deflect the red but deflects the green, while the blue is divided between the two tertiary beams. The red and blue beam Wprb that gets propagated towards the beam Wp is modulated by the valve Vr, then it is analyzed by the absorbent polarizer Pr. Similarly, the green and blue beam Wpvb is modulated by the valve Vv, then it is analyzed by the absorbent polarizer Pv.

The beams coming from the three valves and their polarization analyzers go through suppression means. In the secondary beam Ws modulated by the valve Vb and analyzed by the polarizer Pb, the two red and green components are respectively suppressed by the mirrors Md3 and Md4 placed in the direction of propagation of the beam Ws. The result thereof is a blue modulated beam in this direction. As for the secondary beam Wp, we have seen that the multidielectrical mirror Md2 constitutes a suppression means. In the red and blue beam Wprb, the blue component is suppressed by the mirror Md4. The beam Wprb is deflected by the mirror M1 to get filtered by the mirror Md4 and give a modulated red beam that gets propagated in the direction of the beam Ws and thus gets combined with the modulated blue beam. Similarly, in the green and blue beam Wpvb, the blue component is suppressed by the mirror Md3 and/or Md4 so as to give, at output of the mirror Md4, a modulated green beam that gets combined with the other two color modulated beams to form the color composite modulated beam C representing the projected color image 11.

When the auxiliary primary beam W' illuminates the separator MP as a replacement to the main primary beam W, the secondary beams W'p and W's have directions of propagation perpendicular to those of the beams Wp and Ws. In other words, as illustrated, the beams W'p and W's correspond respectively to the beams Ws and Wp. The multidielectrical mirrors and the analyzers are unaffected by this change in polarization. On the contrary, the optical valves reverse the direction of variation of the rotation induced by the modulation voltage of each valve with respect to the direction obtained with the secondary beams Wp and Ws coming from the main primary beam. This drawback is overcome by modifying the modulation voltage of each valve.

Figure 2:
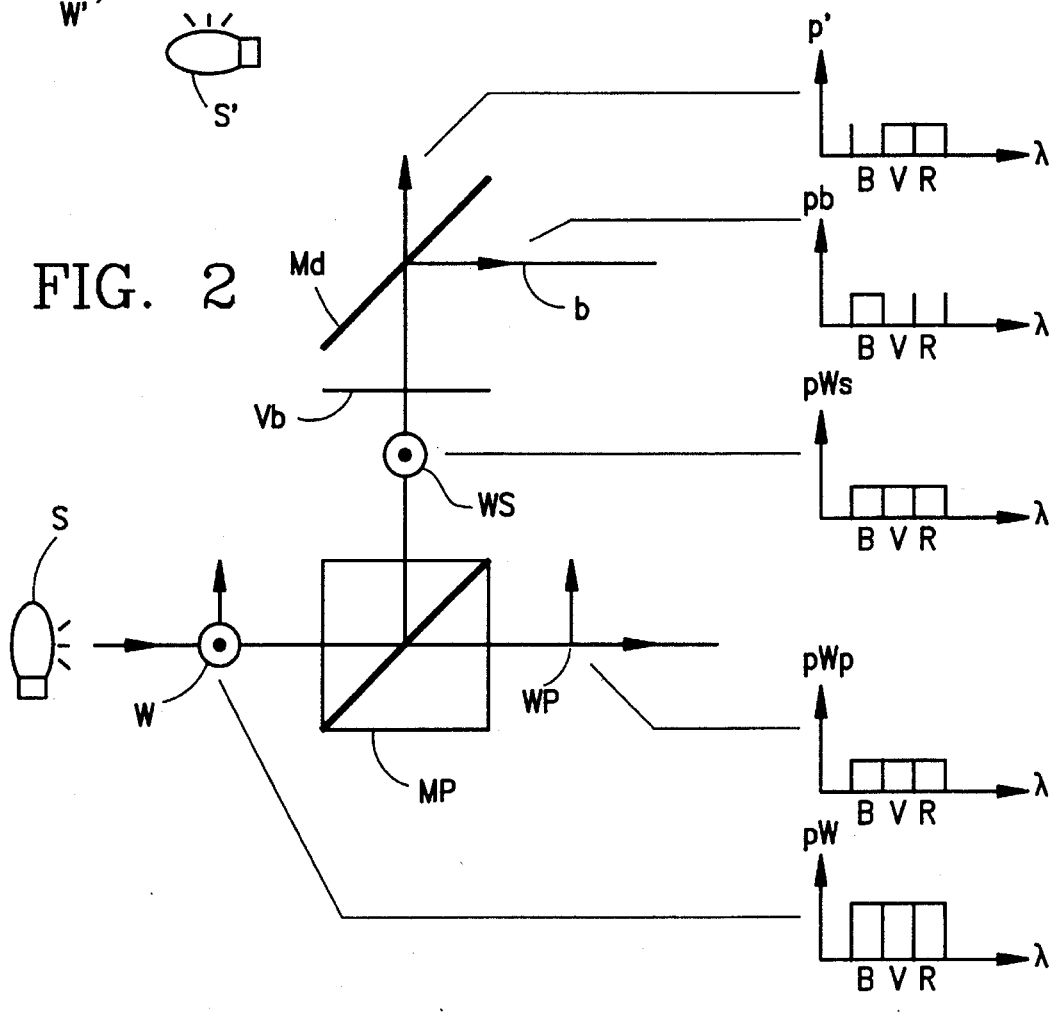
FIG. 2 provides a schematic illustration of the primary and secondary beams at the separator of an alternative embodiment of the projection device shown in FIG. 1 and the diagrams representing the power spectral density of these beams.

There may be many variants of the exemplary embodiment shown in FIG. 1. FIG. 2 illustrates a first variant that consists in replacing the mirror M2 by a multidielectrical mirror Md. In this case, the beam deflected by the mirror Md has only the blue component and goes undeflected through the two multidielectrical mirrors Md3 and Md4 as a blue beam b. The valve Vb may be placed before or after the suppression of the two components green and red by the multidielectrical mirror Md. FIG. 2 shows the valve Vb before suppression as in the foregoing example but it is clear that it could be placed on the path leading to the objective OBJ.

Generally, the means for the suppression of the excess components may be placed equally well before or after modulation by the valves. The advantage of the example illustrated in FIG. 1 lies in the possibility of giving the combination means the additional function of means for the suppression of the color beams. It is therefore clear that the combination means could be separated therefrom. Similarly, the polarizing separator MP could be of a type different from the one illustrated, well known to those skilled in the art, and the multidielectrical mirrors could be replaced by absorbent filters. Furthermore, although in the illustrated separation of the secondary beam Wp, the blue component has been divided between the tertiary beam Wprb and Wpvb, it is possible that this component is contained in only one of the two tertiary beams, or that it is excluded from them, by filtering for example.

The foregoing description highlights the numerous advantages of the method of the invention. It enables the quality of the image to be made independent of the main primary beam or auxiliary primary beam. In other words, the back-up function of the secondary beam gives the same quality as that of the image coming from the main primary beam. From this advantage, there is derived another advantage which is the ability to give the main primary beam the conditions required for day-time projection and the ability to give the auxiliary primary beam the conditions required for night-time projection.

Another major advantage lies in the luminous power of the composite color beam C resulting from the implementation of the method according to the invention. FIG. 2 illustrates the diagrams representing the power spectral density pW of the main primary beam W, the power spectral densities pWs and pWp of the two secondary beams Ws and Wp, the power spectral density pWb of the modulated blue beam b and the power spectral density pC of the composite color beam C. In designating the three color components by B, V and R, the depolarized luminous power of the white beam is expressed by the equation $pW=pB+pV+pR$. It has been seen in the introduction that the prior art method of projection consists of the separation, directly or successively, of the three color components so that the power of the color beams is respectively pB, pV and pR. However, in view of the absorption of the linear polarizers applied before the faces of incidence of the respective valves, the power pC of the beam combining the three color beams is $pC=0.5 (pB+pV+pR)$. According to the invention, assuming also that there are negligible power losses in the cube MP, the power pW of the main beam is divided into equal parts in the two secondary beams Wp and Ws, so that $pWp=pWs=0.5 (pB+pV+pR)$. This can be seen in the diagrams by the superficial contents of the rectangles. The polarized white secondary beam Ws, which is modulated by the valve Vb (without any prior polarizer, since the beam is already polarized) keeps the same power pWs. After filtering by the multidielectrical mirror Md, the components pV and pR are eliminated (the power of these components is designated by p' in the corresponding diagram of FIG. 2) so that the power pb of the blue beam b is equal to 0.5 pB. As for the secondary beam Wp, it has been seen in the exemplary projector shown in FIG. 1 that it is divided into two beams Wprb and Wpvb, one containing the red and the other containing the green, these two beams sharing the blue component in the proportion of $\alpha$ and $(1-\alpha)$. The power values corresponding to these two beams are therefore expressed by:

$pWprb=0.5(pR+\alpha\ pB)$ and $pWpvb=0.5(pV+(1-\alpha)\ pB)$

Since the excess blue component is suppressed to constitute the two green v and red r beams, their power value is:

$pv=0.5\ pV$ and $pr=0.5\ pR$

The composite color beam C therefore has the power value $pC=0.5\ (pB+pV+pR)$. Thus, from the method of the invention, there is obtained about the same power as that obtained by the conventional method. In other words, the fall in energy efficiency due to the presence of the excess components in the white secondary beams is compensated for by the increase of the efficiency of the modulation due to the absence of absorbent polarizers before the valves. It follows therefrom that the method according to the invention may be used to replace the standard method with or without an auxiliary primary beam. This is a major advantage of the invention, in addition to the advantages already referred to.

Another advantage of the method of the invention is that it can be implemented easily. It has been seen, in the example of FIG. 1, that the projector 10 has a very simple structure.

Figure 3:
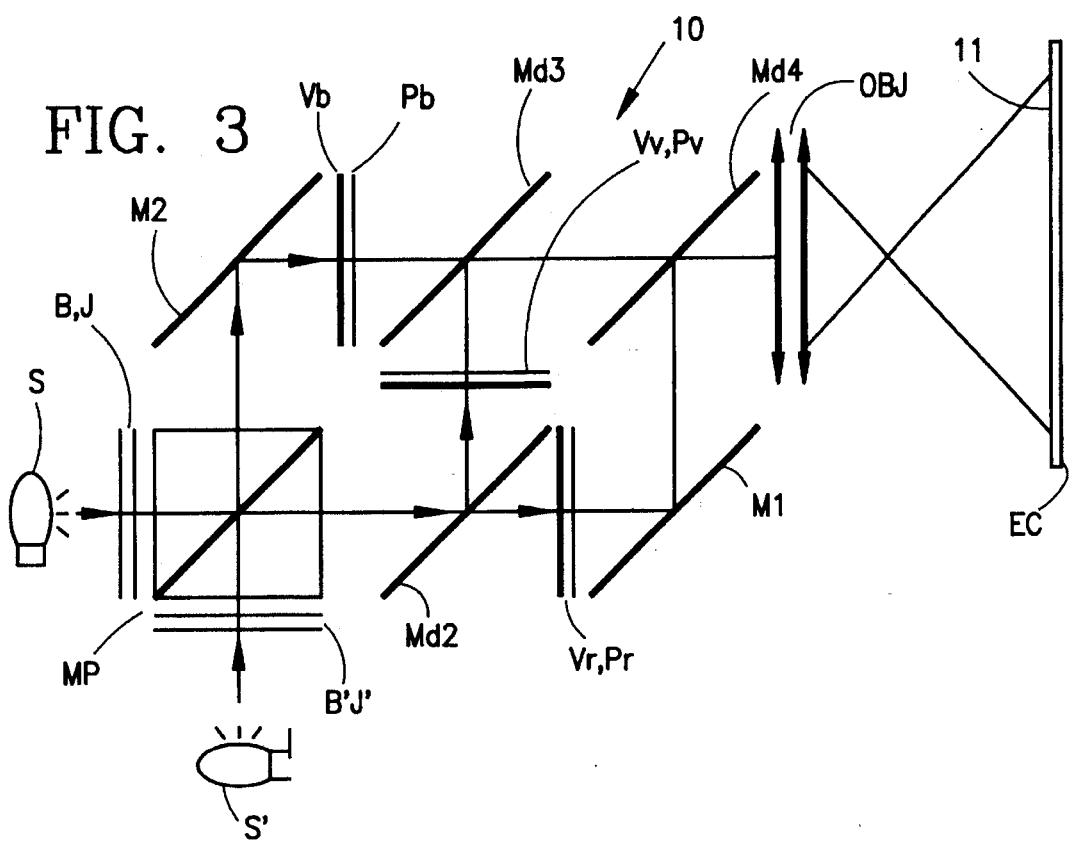
FIGS. 3 and 4 provide a schematic illustration of two other alternative embodiments of a projection device according to the invention.

FIG. 3 illustrates another alternative embodiment of a projection device 10 according to the invention. In FIG. 3, the projection device is that of FIG. 1, to which two polarizers B and J are added as a solution to a problem that can be raised by the exemplary embodiment of FIG. 1. In the example of FIG. 3, it is possible that the polarizing separator MP will not give a perfect separation of the polarization, especially when the incident beams W and W' are imperfectly collimated. Indeed, each of the secondary beams contains a part of radiation polarized in a direction perpendicular to the main direction of polarization. The rate of polarization of each beam, defined by the ratio of the power polarized in one direction to the total power of the beam, is therefore not equal to 100%. The result thereof is a degradation of the contrast of the images given by each of the valves. The polarizers B and J, which shall now be defined, are placed so that they are both crossed by the main primary beam W and possibly by the auxiliary primary beam W' in order to improve the rate of polarization of the two secondary beams that have come therefrom. They thus constitute means to improve the polarization rate by absorbing the undesirable color components.

The two polarizers B and J are selective in terms of wavelength. The polarizer B (bluish appearance in natural light) has the role of improving the rate of polarization of the red and green components of the secondary beam Wp polarized in parallel to the plane of incidence on the polarizing separator MP. It does not degrade any of the color components in a direction of polarization chosen to correspond with the direction s perpendicular to the plane of incidence while it absorbs the red and green components in the orthogonal direction of polarization p.

The polarizer J (yellow appearance in natural light) has the role of improving the rate of polarization of the blue component of the secondary beam with polarization s perpendicular to the plane of incidence of the separator MP. It absorbs the blue component in the direction s and does not degrade any of the color components in the parallel direction p. For example, the polarizers B and J used have been manufactured by one of the firms Sanritsu and Nitto. The polarizer B is placed so that it is crossed first by the corresponding primary beam.

The pair of polarizers B, J therefore has the effect of improving the rate of polarization of the blue component of the secondary beam Ws by suppressing the blue radiations polarized in parallel to the plane of incidence, and of improving the rate of polarization of the red and green components of the secondary beam Wp by suppressing the red or green radiations polarized perpendicularly to the plane of incidence.

Under these conditions, in view of the change in polarization of the secondary beams coming from the auxiliary primary beam, the pair of polarizers B, J has to be placed so that the respective directions of polarization of these polarizers are perpendicular to those of the polarizers of the pair pertaining to the main beam.

Figure 4:
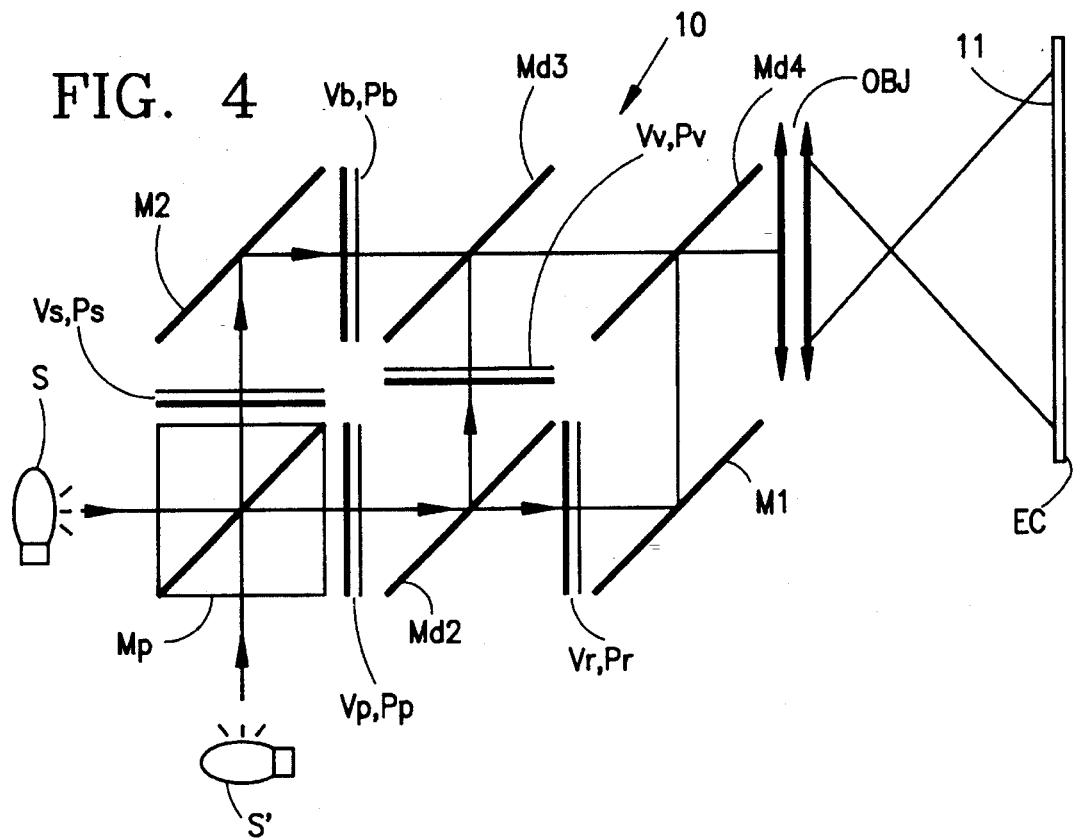

FIG. 4 illustrates another alternative embodiment of a projection device 10 according to the invention, as shown in FIG. 3. The projection device of FIG. 4 resolves the same problem as that of the FIG. 3. In short, an imperfection of the collimation of a primary beam is expressed by a degradation of the contrast of the valves Vb, Vv and Vr creating the image. According to this variant, in the projection device shown in FIG. 1, each secondary beam crosses means to improve the polarization rate, constituting a device, in the example of FIG. 4, to modify the direction of polarization of the beam depending on whether it is the main primary beam W or the auxiliary primary beam W' that is used. In this example, this device is formed by a liquid crystal valve (without image formation) followed by a neutral linear polarizer. Thus, the devices respectively crossed by the secondary beams Wp and Ws are formed by valves Vp and Vs that are respectively followed by neutral linear polarizers Ps and Pp. This device has the advantage of transferring the degradation of the contrast of the valves Vb, Vv and Vr to the additional valves Vs and Vp. Consequently, each of the valves forming the image is illuminated by a beam with a constant direction of polarization, independently of the primary beam W or W'. This alternative embodiment can thus only be aimed at correcting the effects of the change in direction of polarization of the secondary beams coming from the main beam.

The invention has been described according to different embodiments in which the two secondary beams of white light have directions of propagation that are perpendicular to each other, but it is clear that the invention is applicable when these directions are not perpendicular to each other.

Furthermore, the invention has been described in the case of secondary beams that are polarized linearly and perpendicularly with respect to each other, but it is applicable also to the case where the secondary beams are polarized elliptically and in opposite directions.

What is claimed is:

1. A method for the projection of a color image comprising the following steps: 1) generating a primary beam of depolarized and collimated white light, 2) splitting said primary beam into two secondary beams of white light, wherein said two secondary beams have directions of propagation which are separated angularly, and have polarizations which are linear and perpendicular to each other, and 3) modulating, by optical valves, three color beams coming from said primary beam of white light, wherein one of said three color beams comes from a first one of said two secondary beams, and wherein two of said three color beams come from a second one of said two secondary beams.

2. A method according to claim 1, wherein the directions of propagation of said two secondary beams are perpendicular to each other.

3. A method according to claim 1, further comprising a step of generating an auxiliary primary beam of depolarized and collimated white light to replace said primary beam, wherein said method further comprises aligning the two secondary beams coming from the auxiliary primary beam with the two secondary beams coming from the primary beam.

4. A method according to claim 1, further comprising a step of generating an auxiliary primary beam of depolarized and collimated white light to replace said primary beam, wherein said method further comprises aligning the two secondary beams coming from the auxiliary primary beam with the two secondary beams coming from the primary beam.

5. A method according to claim 1, comprising, before or after modulation by each valve, a step of suppressing the undesirable color components.

6. A method for the projection of a color image comprising the following steps 1) generating a primary beam of depolarized and collimated white light, 2) splitting said primary beam into two secondary beams of white light, and 3) modulating, by optical valves, three color beams which come from the primary beam by means for splitting said primary beam into said two secondary beams, wherein said two secondary beams have directions of propagation which are separated angularly, and wherein said secondary beams have polarizations which are elliptical and have opposite directions, and wherein one of said color beams comes from a first of said two secondary beams, and two of said color beams come from a second of said two secondary beams.

7. A method according to claim 6, wherein the directions of propagation of said two secondary beams are perpendicular to each other.

8. A method according to claim 6, further comprising a step of generating an auxiliary primary beam of depolarized and collimated white light to replace said primary beam, wherein said method further comprises aligning the two secondary beams coming from the auxiliary primary beam with the two secondary beams coming from the primary beam.

9. A method according to claim 6, comprising, before or after modulation by each valve, a step of suppressing the undesirable color components.

10. A device for the projection of a color image comprising a generator of a primary beam of depolarized and collimated white light, and separator means for separating the primary beam into two secondary beams of white light, wherein said two secondary beams have directions of propagation which are perpendicular to each other, and wherein said secondary beams have polarizations which are linear and perpendicular to each other, three optical valves for the respective modulation of three color beams which come from said secondary beams and respectively represent three basic color components, and means for combining said three color beams, wherein one of said three color beams comes from a first of said two secondary beams, and wherein two of said three color beams come from a second of said two secondary beams.

11. A device according to claim 10, further comprising generator means for generating an auxiliary primary beam of depolarized and collimated white light, wherein the secondary beams coming from the auxiliary primary beam are aligned on the two secondary beams coming from the primary beam.

12. A device according to claim 10, further comprising first suppression means for suppressing two undesirable color components in a first of the secondary beams of white light passing therethrough to form a first color beam, said first suppression means being associated with a first of said three optical valves, and a second separator means for producing two tertiary beams from a second of said secondary beams of white light, said two tertiary beams including the two color components proper to a second and a third of the optical valves and means for suppressing the undesirable color components as said two tertiary beams pass through said suppressing means and said second and third optical valves, to give the other two color beams.

13. A device according to claim 10, further comprising means for improving the rate of polarization of the secondary beams.

14. A device according to claim 13, wherein the means for improving the polarization rate are so constructed and arranged that said means is crossed by at least one of the primary beams.

15. A device according to claim 13, wherein the means for improving the polarization rate are so constructed and arranged to be crossed respectively by the two secondary beams and comprise means for modifying the direction of polarization of the respective secondary beams depending on which of the primary beams is used, so as to maintain the direction of polarization of the beam crossing each of the valves substantially constant independently of the primary beam.

16. A device according to claim 15, wherein said polarization rate improving means and said polarization direction modifying means comprise two optical valves in series with two associated neutral linear polarizers.

17. A device for the projection of a color image, comprising a generator means for generating a primary beam of depolarized and collimated white light, separator means for separating said primary beam of white light into two secondary beams, three optical valves for the respective modulation of three color beams which come from the secondary beams and respectively represent three basic color components, and means for combining said three color beams, wherein said secondary beams of white light have directions of propagation which are perpendicular to each other, and have polarizations which are elliptical and have opposite directions, and wherein one of said three color beams comes from a first of said two secondary beams, and wherein two of said three color beams come from a second of said two secondary beams.

18. A device according to claim 17, further comprising generator means for generating an auxiliary primary beam of depolarized and collimated white light, wherein the secondary beams coming from the auxiliary primary beam are aligned on the two secondary beams coming from the primary beam.

19. A device according to claim 17, further comprising first suppression means for suppressing two undesirable color components in a first of the secondary beams of white light passing therethrough to form a first color beam, said first suppression means being associated with a first of said three optical valves, and a second separator means for producing two tertiary beams from a second of said secondary beams of white light, said two tertiary beams including the two color components proper to a second and a third of the optical valves and means for suppressing the undesirable color components as said two tertiary beams pass through said suppressing means and said second and third optical valves, to give the other two color beams.

* * * * *

UNITED STATES PATENT AND TRADEMARK OFFICE
CERTIFICATE OF CORRECTION

PATENT NO. : 5,465,177
DATED : November 7, 1995
INVENTOR(S) : Bruno BARBIER et al It is certified that error appears in the above-indentified patent and that said Letters Patent is hereby corrected as shown below:

Col. 8, line 17 (Claim 4, line 1) "claim 1" should be --2--.

Col. 10, line 5 (Claim 17, line 4) "primary beam of white light into two secondary beams,..." should be --primary beam into two secondary beams of white light...--.

Signed and Sealed this

Fourteenth Day of May, 1996

Attest:

BRUCE LEHMAN

Attesting Officer     Commissioner of Patents and Trademarks